United States Patent
Roche

(10) Patent No.: US 10,337,521 B2
(45) Date of Patent: Jul. 2, 2019

(54) FAN BLADE WITH INTEGRATED COMPOSITE FAN BLADE COVER

(71) Applicant: UNITED TECHNOLOGIES CORPORATION, Farmington, CT (US)

(72) Inventor: Charles H. Roche, Tolland, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 466 days.

(21) Appl. No.: 15/039,246

(22) PCT Filed: Sep. 29, 2014

(86) PCT No.: PCT/US2014/058022
§ 371 (c)(1),
(2) Date: May 25, 2016

(87) PCT Pub. No.: WO2015/102691
PCT Pub. Date: Jul. 9, 2015

(65) Prior Publication Data
US 2017/0023007 A1    Jan. 26, 2017

Related U.S. Application Data

(60) Provisional application No. 61/908,833, filed on Nov. 26, 2013.

(51) Int. Cl.
*F01D 5/14* (2006.01)
*F04D 29/38* (2006.01)
(Continued)

(52) U.S. Cl.
CPC ......... *F04D 29/388* (2013.01); *F01D 5/147* (2013.01); *F01D 5/282* (2013.01); *F04D 29/324* (2013.01);
(Continued)

(58) Field of Classification Search
CPC .... F04D 29/388; F04D 29/023; F04D 29/324; F04D 29/325; F01D 5/147; F01D 5/16; F01D 5/282; F01D 5/048
(Continued)

(56) References Cited

U.S. PATENT DOCUMENTS 4,820,117 A    4/1989  Larrabee et al.
6,039,542 A *  3/2000  Schilling ........... F01D 5/16
                                                416/224

(Continued)

FOREIGN PATENT DOCUMENTS

DE    102013219772 A1    4/2015
EP       0926312 A2      6/1999
(Continued)

OTHER PUBLICATIONS

English Machine Translation to DE102013219772 Abstract.
(Continued)

*Primary Examiner* — Aaron R Eastman
(74) *Attorney, Agent, or Firm* — Cantor Colburn LLP

(57) ABSTRACT

A fan blade for a turbofan gas turbine engine is disclosed. The fan blade includes a body having a pressure side and a suction side. The body also includes a leading edge, a trailing edge, a distal tip and a base that is coupled to a hub. The suction side of the body includes at least one cavity for purposes of reducing the weight of the fan blade. The at least one body is surrounded by a slot that extends outwardly away from the cavity. A lip that extends inwardly towards the body further defines the slot. A cover is provided that overlays the cavity and includes a peripheral edge that is received in the slot and that is at least partially covered by the lip for a robust connection between the fan blade body and the cavity cover.

17 Claims, 4 Drawing Sheets

(51) Int. Cl.
  *F01D 5/28* (2006.01)
  *F04D 29/32* (2006.01)
  *F04D 29/02* (2006.01)

(52) U.S. Cl.
  CPC .......... *F04D 29/325* (2013.01); *F04D 29/023* (2013.01); *F05D 2220/36* (2013.01); *Y02T 50/672* (2013.01); *Y02T 50/673* (2013.01)

(58) Field of Classification Search
  USPC ........................................................ 416/230
  See application file for complete search history.

(56) References Cited

U.S. PATENT DOCUMENTS

| | | | |
|---|---|---|---|
| 9,121,287 B2* | 9/2015 | Weisse | F01D 5/147 |
| 2006/0039792 A1 | 2/2006 | Ferte et al. | |
| 2008/0253885 A1* | 10/2008 | Foose | F01D 5/147 |
| | | | 415/208.2 |
| 2010/0136278 A1* | 6/2010 | Cadd | B29C 63/0021 |
| | | | 428/60 |
| 2012/0034833 A1* | 2/2012 | Schaube | A63C 11/227 |
| | | | 442/172 |
| 2012/0237351 A1 | 9/2012 | Weisse | |
| 2013/0039774 A1* | 2/2013 | Viens | F01D 5/147 |
| | | | 416/226 |
| 2013/0101406 A1* | 4/2013 | Kweder | B29C 70/46 |
| | | | 415/200 |
| 2013/0108470 A1 | 5/2013 | Weisse | |
| 2013/0156594 A1* | 6/2013 | Kray | F01D 9/042 |
| | | | 416/241 A |
| 2014/0072427 A1* | 3/2014 | Weisse | F01D 5/147 |
| | | | 415/220 |
| 2015/0125308 A1* | 5/2015 | Radomski | B23P 15/04 |
| | | | 416/224 |
| 2015/0252679 A1* | 9/2015 | Pope | F01D 5/147 |
| | | | 415/183 |
| 2016/0024934 A1* | 1/2016 | Schwarz | F01D 5/16 |
| | | | 60/805 |
| 2016/0177732 A1* | 6/2016 | Whitehurst | F01D 5/147 |
| | | | 60/805 |
| 2016/0311052 A1* | 10/2016 | Wallis | B23K 20/02 |
| 2016/0333710 A1* | 11/2016 | Klinetob | F01D 5/26 |

FOREIGN PATENT DOCUMENTS

| | | | | |
|---|---|---|---|---|
| EP | 1983160 A2 | 10/2008 | | |
| EP | 2366871 A1 | 9/2011 | | |
| WO | WO-2015095205 A1 * | 6/2015 | .......... | B23K 20/122 |

OTHER PUBLICATIONS

European Search Report for Application No. EP 14 87 6036.
International Search Report for International Application No. PCT/US2014/058022; dated Jul. 17, 2015.
Written Opinion for International Application No. PCT/US2014/058022; dated Jul. 17, 2015.

* cited by examiner

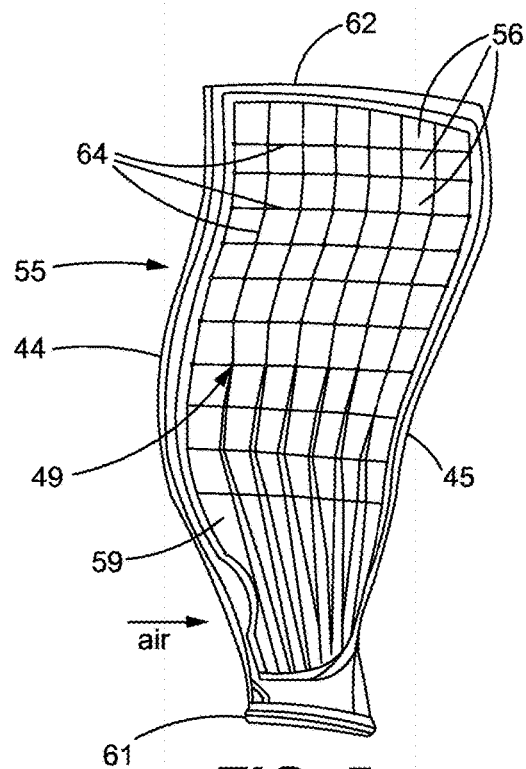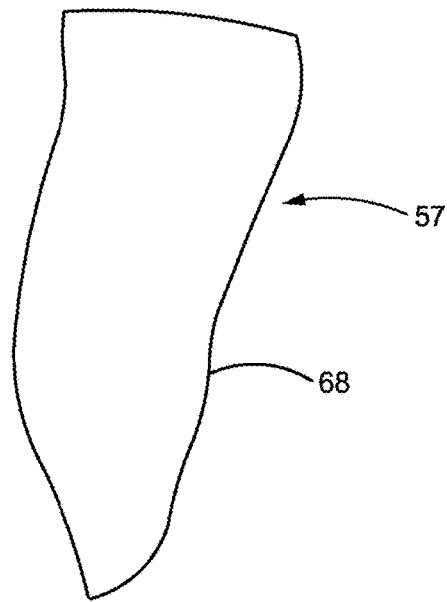
FIG. 5  FIG. 6
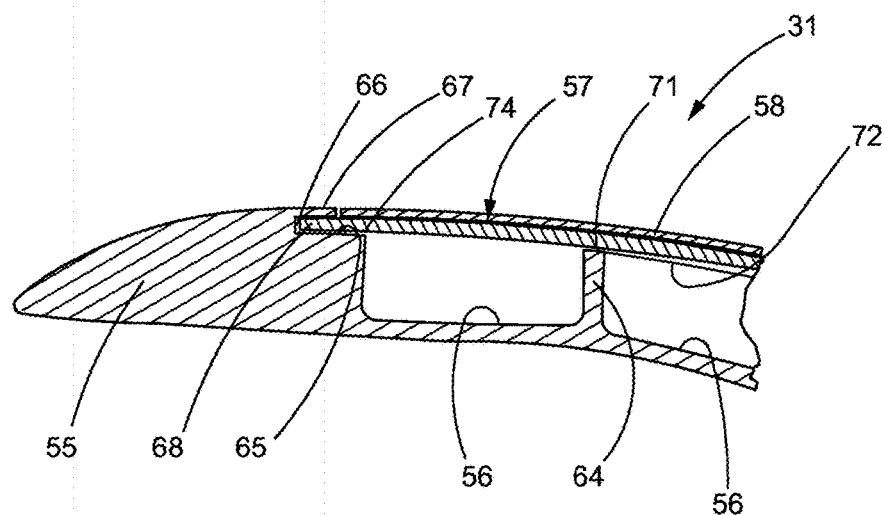
FIG. 7

FAN BLADE WITH INTEGRATED COMPOSITE FAN BLADE COVER

BACKGROUND

Technical Field

Disclosed herein are fan blades for turbofan gas turbine engines. In one example, a disclosed fan blade may include a metallic body having one or more hollow cavities on a suction side of the fan blade for weight reduction and a composite cover that encloses the hollow cavities.

Description of the Related Art

A geared turbofan engine is a type of turbofan airplane engine, similar to a turbojet. A geared turbofan engines, also known as a type of a gas turbine engine, may include a geared, ducted fan and a smaller diameter gas turbine engine mounted behind the fan that powers the fan. Part of the airstream passes through a core of the engine, which includes low and high-pressure compressors, a combustion chamber and high and low pressure turbines. The high and low-pressure turbines are disposed downstream of the combustor between the combustor and an exhaust. In contrast, the low and high compressors are disposed upstream of the combustor and between the combustor and fan. The high and low-pressure turbines drive the high and low-pressure compressors respectively and the fan.

Weight reduction of gas turbine engines used for aircraft results in fuel savings. One known means for reducing the weight of a gas turbine engine is to include hollow cavities in some of the components that do not need to be solid metal to meet structural requirements. One such component is a fan blade, also known as a type of airfoil. Some fan blades include a titanium or aluminum body with recesses or cavities disposed in the non-flow path convex side of the fan blade, also known as the suction side of the fan blade. The opposite side of the fan blade is the concave or suction side. The cavities may be covered by a composite cover, typically made from fibers and resin, and the fan blade is the then covered with a damage resistant coating that is typically non-structural and inert.

During engine operation, a fan blade or a fragment thereof may separate from the remainder of the fan (a so-called "fan blade-off" or "fan blade-out" (FBO) event). An FBO event may be caused by a foreign object damage (FOD) event. One portion of a fan blade that is vulnerable to separation from the fan blade body is the composite cover for the cavities. Partial or complete separation of the cover from one or more fan blades can cause damage to a downstream component of the engine. The damage caused by the separated cover or partial separated cover may depend on numerous factors, including the size and mass of the separated cover or fragment, the design of the downstream engine components, etc. Further, partial or complete separation of a cover may displace the center of gravity (center of mass) of the entire fan assembly from its central axis. At least initially, bearings may constrain the fan radially so that it continues to rotate about its central axis rather than about the displaced center of gravity. However, if the bearings fail, rotation of the fan about the displaced center of gravity may result in forces that may also damage other downstream engine components.

If an FBO event severely damages the engine, the engine may cease normal operation, shut down or lock, and consequently produce no further power. However, despite the engine shut down, it is undesirable to stop rotation of the fan. If rotation of the fan stops, the engine becomes an extreme source of aerodynamic drag for the aircraft. Such drag would be particularly significant in a twin-engine aircraft, with one engine mounted to each wing nacelle. This is a common construction for many passenger aircraft. Thus, in a twin-engine aircraft, the combination of drag from the shut-down engine and thrust from the remaining engine would produce an excessive yawing moment not easily overcome by the aircraft rudder.

To overcome this problem, the fan of a shut down or locked gas turbine engine may be designed continue to spin at above-idle speed as air is forced through the fan due to forward aircraft motion. This unpowered fan rotation is called "windmilling." Even a fan of a shut down engine on the ground may be designed to windmill. A windmilling engine has less aerodynamic drag than does a completely stopped or locked engine. To remain windmilling, the engine must resist damage to the turbine, bearings, etc.

The engine must also be configured to avoid catastrophic damage, which may be caused by fan blade failure, and which might permit fan blade portions to enter the high-pressure turbine. If a part or debris enters the high pressure turbine, for example, centrifugal forces may cause the parts or debris to puncture one or both of the nacelles, the fuselage or allow the engine to detach from the aircraft or damage the wing.

Hence, there is a need for an improved fan blade design that is lightweight, includes hollow cavities that are covered, but that includes a means for covering the hollow cavities that will provide better resistance to damage in the event of any FBO-causing event.

SUMMARY OF THE DISCLOSURE

In one aspect, a fan blade is disclosed. The disclosed fan blade may include a body that may include a pressure side and a suction side. The pressure and suction sides of the body may be disposed between and connected to a leading edge and a trailing edge. Further, the pressure side and suction side of the body may also be disposed between and connected to a base and a tip. The suction side of the body may include at least one cavity that extends into the suction side and towards the pressure side. The cavity or cavities may be surrounded by a slot that extends outwardly or laterally away from the cavity and into the body. The body may further include a lip that extends inwardly back towards the cavity and that at least partially defines the slot. The disclosed fan blade may further include a cover that overlays the cavity and that includes a peripheral edge that is received in the slot and that is at least partially covered by the lip.

In another aspect, a fan blade assembly is disclosed. The disclosed fan blade assembly may include a hub that may be coupled to a plurality of radially outwardly extending fan blades. Each fan blade may include a body that may include a pressure side and a suction side. The pressure and suction sides of the body may be disposed between and connected to a leading edge and a trailing edge. The pressure and suction sides of the body may also be disposed between and connected to a base and a tip. The suction side of the body may include at least one cavity that extends into the suction side and towards the pressure side. The cavity or cavities may be surrounded by a slot that extends outwardly or laterally away from the cavity and into the body. The body may further include a lip that extends inwardly back towards the cavity (or cavities) and that at least partially defines the slot. Each fan blade may further include a cover that overlays the cavity and includes a peripheral edge that is received in the slot and that is at least partially covered by the lip. Each fan blade may further include a coating that is disposed over the cover, wherein the coating may be flush with the lip.

In another aspect, a method of fabricating a fan blade of a turbofan gas turbine engine is disclosed. The method may include manufacturing a body including a pressure side and a suction side. The pressure and suction sides of the body may be disposed between and connected to a leading edge and a trailing edge. The pressure and suction sides of the body may also be disposed between and connected to a base and a tip. The suction side may include a plurality of cavities that extend into the suction side and towards the pressure side of the body. The cavities may be surrounded by a slot that extends outwardly or laterally away from the cavities and into the body. The body may further include a lip that extends inwardly back towards the cavities and at least partially defines the slot. The method may further include providing a cover that includes a peripheral edge. The cover is sized so that the peripheral edge may be received in the slot. The method may further include covering the cavities with the cover by inserting the peripheral edge of the cover into the slot so that the lip at least partially covers the cover. And, the method may include coating the cover with a coating layer sufficiently thick so that the coating layer is flush with the lip.

In any one or more of the embodiments described above, the cover may be coated with a coating. In a further refinement, the coating and the lip have thicknesses that are substantially equal.

In any one or more of the embodiments described above, the coating and the lip each include outer surfaces that are flush with each other.

In any one or more of the embodiments described above, the cavity may include a plurality of cavities that are surrounded by the slot. In a further refinement, the cavities may be separated by walls that extend towards the suction side of the body. In another refinement, the walls that separate the cavities may each terminate at an outer edge that is substantially coplanar with the slot.

In any one or more of the embodiments described above, the slot may include an inner wall disposed opposite the slot from the lip. Further, the cavity or cavities may include a plurality of cavities wherein the cavities are separated by a wall that terminates at an outer edge. Still further, the outer edge of the wall may be substantially coplanar with the inner wall of the slot.

In any one or more of the embodiments described above, the cavity or cavities may accommodate a filler material.

In any one or more of the embodiments described above, the cavity or cavities may be filled with a sacrificial material that decomposes when exposed to heat or a caustic agent.

In any one or more of the embodiments described above, the cover may be a composite material that includes fibers and resin.

In any one or more of the embodiments described above, the cover may include a fluoroelastomer.

In any one or more of the embodiments described above, the cavity or cavities may be filled with a sacrificial material before the cavity or cavities are covered with the cover and before the cover is coated with the coating. The cover and coating are then cured, which results in removal of the sacrificial material. In a further refinement, the sacrificial material is removed by ablation. In a further refinement, the sacrificial material is removed by heat. In yet another refinement, the sacrificial material is removed by exposure to a caustic agent.

In any one or more of the embodiments described above, the body may be fabricated from aluminum, titanium, an aluminum alloy, a titanium alloy or combinations thereof.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 5 is a perspective view of a metallic fan blade body used to fabricate a fan blade in accordance with this disclosure.

FIG. 6 is a cover for the cavities disposed on the suction side of the fan blade body illustrated in FIG. 5.

FIG. 7 is a partial sectional view of a disclosed fan blade.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
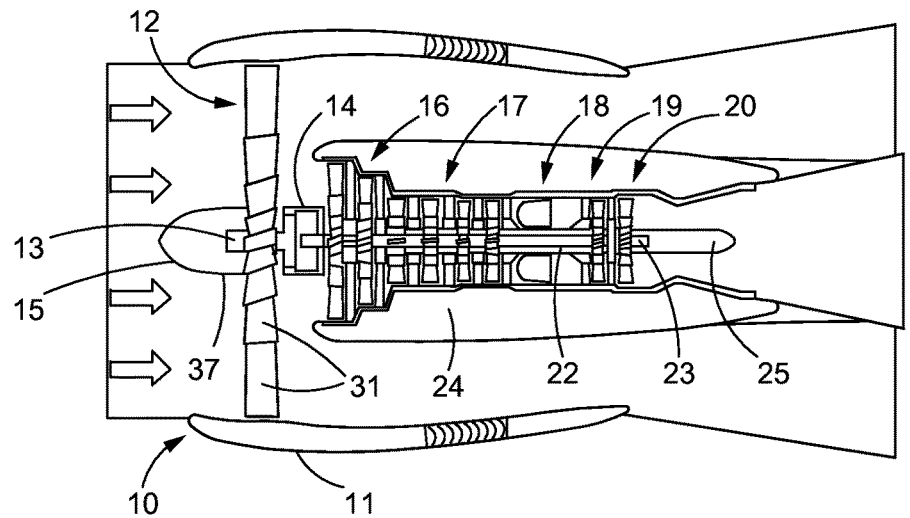
FIG. 1 is a sectional view of a turbofan gas turbine engine.

FIG. 1 illustrates a gas turbine engine 10 that is of the turbofan type. The engine 10 includes a nacelle 11, which surrounds a fan 12 that may be mounted onto a shaft 13 that may be coupled to a gearbox 14. An aerodynamic nose 15 is typically mounted to the hub 37 and in front of the fan 12. A gearbox 14 may be coupled to a low pressure compressor (LPC) 16 which is disposed forward of a high pressure compressor (HPC) 17. The HPC 17 may be disposed forward of a combustor 18 which, in turn, may be disposed forward of a high pressure turbine (HPT) 19 and a low pressure turbine (LPT) 20. The HPT 19 may be mounted onto a high pressure shaft 22, which drives the HPC 17. The LPT 20 may be mounted onto a low pressure shaft 23, which drives the LPC 16. The LPC 16, HPC 17, combustor 18, HPT 19 and LPT 20 may be housed within a core nacelle 24.

Air flow enters the nacelle 11, which may at least partially surround the core nacelle 24. The fan 12 may communicate airflow into the core nacelle 24 and to the LPC 16 and the HPC 17. Core air flow compressed by first by the LPC 16 and then by the HPC 17 may be mixed with the fuel in the combustor 18 where it may be ignited, and burned. The resultant high pressure combustion products are expanded through the HPT 19 and LPT 20. The high and low pressure turbines 19, 20 are separately and rotationally coupled to the high and low compressors 17, 16 respectively to drive the compressors 17, 16 in response to expansion of the combustion products received from the combustor 18. The LPT 20 may also drive the fan 12 through the low pressure shaft 23, which may be coupled to gear box 14. An exhaust stream exits the core nacelle 24 past a tail cone 25.

Figure 2:
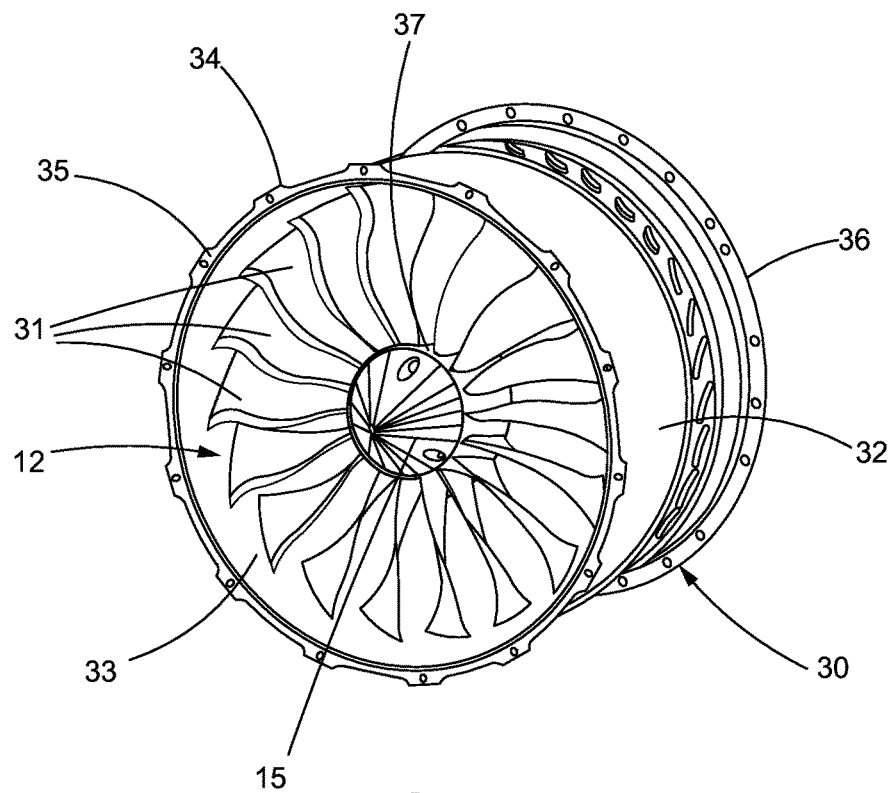
FIG. 2 is a perspective view of a fan case and fan blade assembly for a turbofan gas turbine engine, such as the engine illustrated in FIG. 1.

FIG. 2 shows a fan case 30 (not shown in FIG. 1) that surrounds the fan 12 having an array of fan blades 31. The fan case 30 may include: a hollow body 32; an abradable liner 33 disposed inside the hollow body 32; a forward flange 34 on the hollow body 20 defining a surface 35 for mating to a forward part of the nacelle 11 (not shown); and a rear flange 36 for mating to an aft part of the nacelle 11 (also not shown). The abradable liner 33 circumscribes the fan blades 31, which are coupled to the hub 37.

Figure 3:
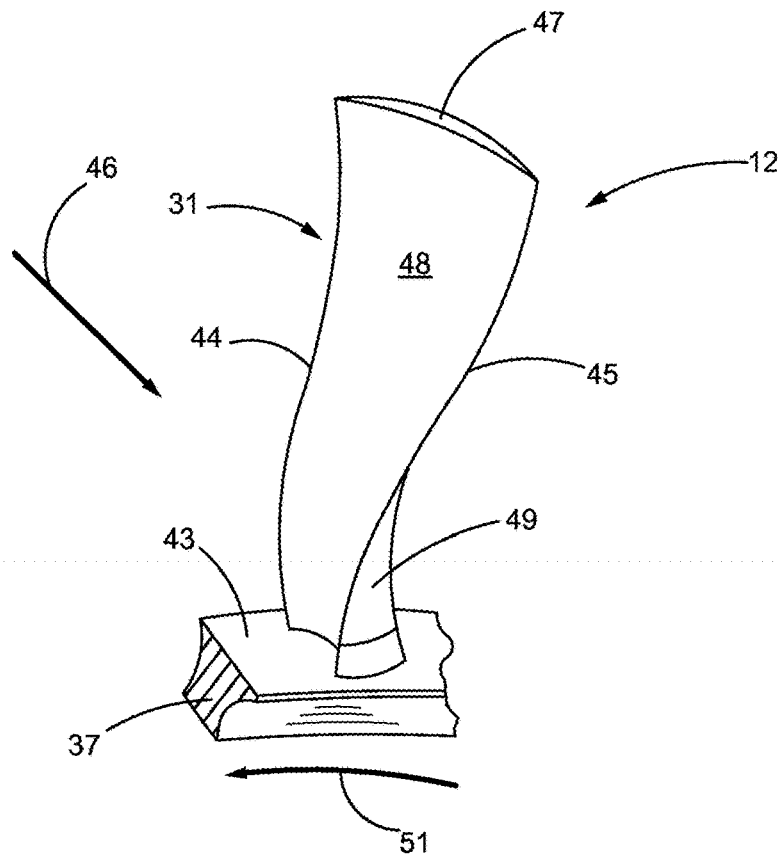
FIG. 3 is a perspective view of a fan blade coupled to a hub.

In FIG. 3, a portion of the fan 12 is illustrated and includes the hub 37 and a plurality of circumferentially spaced apart fan blades 31 (a.k.a., rotor blades or airfoils) extending radially outwardly from a periphery 43 of the annular hub 37. The fan blade 31 may include a leading edge 44 and a trailing edge 40, with respect to the airflow direction as indicated by arrow 46. The leading and trailing edges 44, 45 extend from the periphery 43 of the hub 37 to a tip 47 of the fan blade 31. The fan blade 31 may further include a concave pressure side 48 and a convex suction side 49, joined together at the respective leading and trailing edges 44, 45. The fan blade 31 rotates in a rotational direction as illustrated by arrow 51. The pressure side 48 and the suction side 49 are aerodynamically configured for maximizing the efficiency of air compression and achieve desired pressure ratio. It will be noted that fan blades for gas turbine engines may be provided in the variety of sizes, shapes and styles. The fan blades shown at 31 in FIGS. 2-3 and 5-9 are but mere examples and this disclosure is not limited to the specific fan blades disclosed herein. Further, the disclosed fan blade designs may be adapted for use in other types of jet engines, propellers, rotors, etc.

Figure 4:
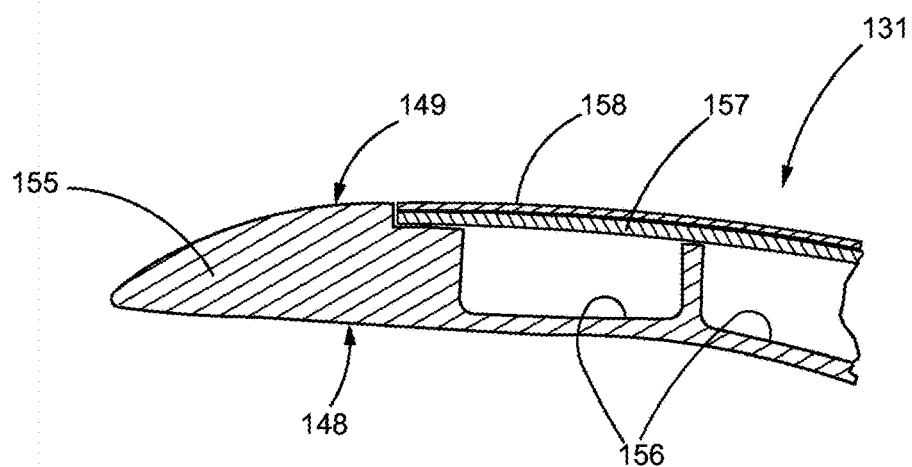
FIG. 4 is a partial sectional view of a prior art fan blade.

This disclosure relates to the convex or suction side 49 of a fan blade 31 (or airfoil, rotor blade, etc.) shown in FIG. 3. Referring to the prior art fan blade 131 illustrated in FIG. 4, the fan blade 131 may include a main body 155 that is typically fabricated from titanium, a titanium alloy, aluminum, aluminum alloy or other suitable structural materials that will be apparent to those skilled in the art. To reduce the weight of the fan blade 131, cavities 156 are formed through the suction side 149 of the fan blade 131. A cover 157 may be placed over the cavities 156 as shown in FIG. 4.

To provide a smooth transition between the cover 157 and the body 155 of the fan blade 131, a coating 158 may be applied over the cover 157. While the coating 158 may be a damage tolerant coating, during a FOD (foreign object damage) event such as a bird strike, the cover 157 can become dislodged from the fan blade 131 which can cause damage to downstream components of the engine 10 illustrated in FIG. 1.

Typically, the cover 157 may be fabricated from a fiber/resin composite material, usually epoxy-based, such as carbon fiber reinforced polymer (CFRP) and/or glass fiber reinforced polymer (GFRP). The protective coating 157 may be made from an elastomer such as a fluoropolymer elastomer like VITON®. Thus, a typical cover 157 may be fabricated from relatively robust materials that can damage various downstream components such as the LPC 16, HPC 17, combustor 18, HPT 19 or LPT 20 or various parts or components associated with any portion of the engine 10 disposed downstream of the fan 12.

Turning to FIG. 5, a disclosed fan blade body 55 may include a base or root 61 for purposes of coupling the fan blade body 55 to the hub 37 (see FIGS. 1-3). The fan blade body 55 also includes a distal tip 62. In FIG. 5, the convex suction side 49 of the body 55 is shown which includes a plurality of cavities 56 that are separated by intersecting walls 64. The suction side 49 of the body 55 may be disposed between a leading edge 44 and a trailing edge 45. To enclose the cavities 56, a cover 57 is shown in FIG. 6. However, in contrast to relying upon an exterior coating to secure the cover 57 to the body 55 as shown in FIG. 7, the body 55 may include a peripheral slot 65. The slot 65 may include a distal end 66 and may further be defined by a lip 67 as shown in FIG. 7. In essence, the slot 65 extends laterally from the cavity 56 before terminating at the distal end 66. The body 55 then extends inwardly back towards the cavity 56 in the form of the lip 67 that further defines the slot 65. The slot 65 is used to accommodate a peripheral edge 68 of the cover 57. By disposing the peripheral edge 68 of the cover 57 in the slot 65 of the fan blade body 55, a more secure connection between the cover 57 and the body 55 is established. Further, the coating 58 may be applied to the cover 57 without the need for applying the coating 58 over the lip 67. The walls 64 that separate the cavities 56 may terminate at an upper edge 71 that engages an underside 72 of the cover 57. The upper edges 71 of the walls 64 may be substantially coplanar with the slot 65. More specifically, the upper edges 71 of the walls 64 that separate the cavities 56 may be coplanar with the inner wall of the body 55 that, with the lip 67, defines the slot 65.

Composite structures like the composite cover 57 can be pliable before curing and so can be bent or crinkled to tuck under the lip 67. However, it is important that a sufficient bond be created along the bimaterial interface, that is, along the area of contact between the peripheral edge 59 of the composite cover 57 and the metallic inner walls of the slot 65, especially at the distal end 66 of the slot 65.

Figure 8:
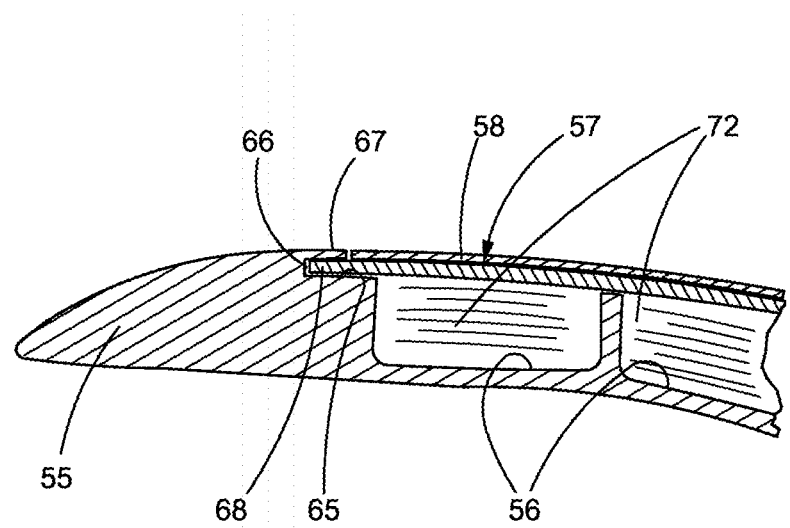
FIG. 8 is a partial sectional view of another disclosed fan blade wherein the cavities are filled with a filler material.
Figure 9:
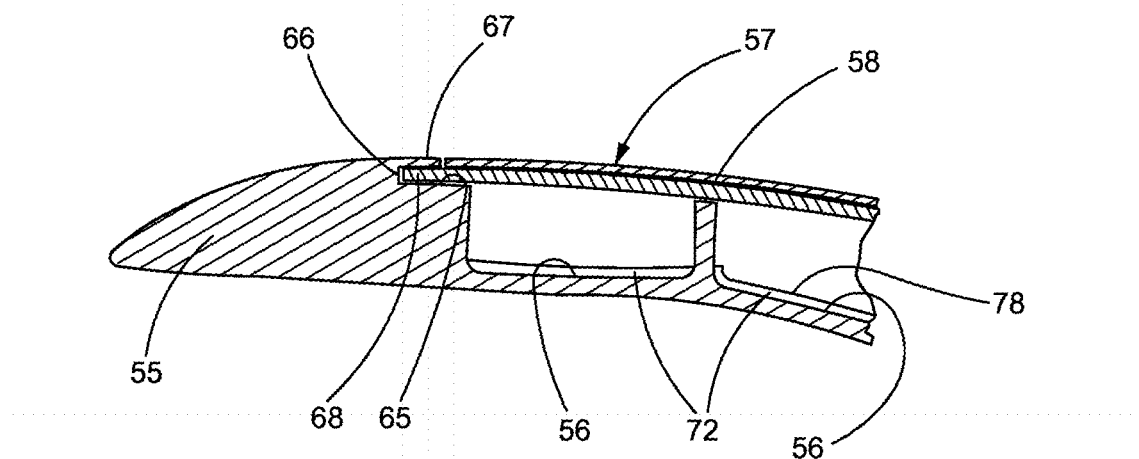
FIG. 9 is a sectional view of yet another disclosed fan blade wherein the cavities include residual amounts of sacrificial material after the curing process has been completed.

As shown in FIG. 8, the cavities 56 may be filled wholly or partially with a filler material 72. The filler material 72 may form a permanent part of the fan blade 31 or, instead, the filler material 72 may be sacrificial filler material that decomposes or otherwise ablates during the curing of the cover 57 and the coating 58 as shown in FIG. 9, which illustrates only residual amounts of filler 72 disposed in the cavities 56.

What is claimed:

1. A fan blade comprising:
  a body including a pressure side and a suction side, the pressure and suction sides being disposed between and connected to a leading edge and a trailing edge, the pressure side and suction side also being disposed between and connected to a base and a tip;
  the suction side including a plurality of cavities that extend through the suction side and towards the pressure side, the plurality of cavities being surrounded by a slot that extends outwardly away from the plurality of cavities and into the body;
  a cover that overlays the plurality of cavities and that includes a peripheral edge that is received in the slot and that is at least partially covered by the lip, wherein the body further includes a lip that extends inwardly towards the plurality of cavities and that at least partially defines the slot, wherein the slot includes an inner wall disposed opposite the slot from the lip and the peripheral edge of the cover that is received in the slot is at least partially covered by the lip, and wherein the plurality of cavities are separated by a wall that terminates at an outer edge, the outer edge of the wall being coplanar with the inner wall of the slot.

2. The fan blade of claim 1 further including a coating disposed over the cover.

3. The fan blade of claim 2 wherein thicknesses of the coating and the lip are equal.

4. The fan blade of claim 2 wherein the coating and the lip each include outer surfaces that are flush with each other.

5. The fan blade of claim 1 wherein the plurality of cavities are separated by walls that extend towards the suction side of the body.

6. The fan blade of claim 5 wherein the walls each terminate at an outer edge that is coplanar with the slot.

7. The fan blade of claim 1 wherein the plurality of cavities accommodate a filler material.

8. The fan blade of claim 1 wherein the plurality of cavities are filled with a sacrificial material.

9. The fan blade of claim 1 wherein the cover is fabricated from fibers and resin.

10. The fan blade of claim 1 wherein the cover is fabricated from a fluoroelastomer.

11. A fan blade assembly comprising:
a hub coupled to a plurality of radially outwardly extending fan blades, each fan blade including
a body including a pressure side and a suction side, the pressure and suction sides being disposed between and connected to a leading edge and a trailing edge, the pressure side and suction side also being disposed between and connected to a base and a tip;
the suction side including a plurality of cavities that extend through the suction side and towards the pressure side, the plurality of cavities being surrounded by a slot that extends outwardly away from the plurality of cavities and into the body;
a cover that overlays the plurality of cavities and that includes a peripheral edge that is received in the slot and that is at least partially covered by the lip;
a coating disposed over the cover;
wherein the coating is flush with the lip and wherein the body further includes a lip that extends inwardly towards the plurality of cavities and that at least partially defines the slot, wherein the slot includes an inner wall disposed opposite the slot from the lip and the peripheral edge of the cover that is received in the slot is at least partially covered by the lip, and wherein the plurality of cavities are separated by a wall that terminates at an outer edge, the outer edge of the wall being coplanar with the inner wall of the slot.

12. The fan blade of claim 11 wherein the plurality of cavities are separated by walls that extend towards the suction side of the body, wherein
outer edges of the walls that separate the plurality of cavities are coplanar with the inner wall of the slot.

13. The fan blade assembly of claim 11 wherein at least one of the plurality of cavities accommodates a filler material.

14. A method for fabricating a fan blade of a turbofan gas turbine engine, the method comprising:
manufacturing a body including a pressure side and a suction side, the pressure and suction sides being disposed between and connected to a leading edge and a trailing edge, the pressure side and suction side also being disposed between and connected to a base and a tip, the suction side including a plurality of cavities that extend through the suction side and towards the pressure side, the cavities being surrounded by a slot that extends outwardly away from the cavities and into the body, the body further including a lip that extends inwardly towards the cavities and that at least partially defines the slot, wherein the slot includes an inner wall disposed opposite the slot from the lip, the plurality of cavities being separated by a wall that terminates at an outer edge, the outer edge of the wall being coplanar with the inner wall of the slot;
providing a cover that includes a peripheral edge, the cover being sized so that the peripheral edge is received in the slot;
covering the cavities with the cover by inserting the peripheral edge of the cover into the slot of the body so that the lip at least partially covers the cover; and
coating the cover with a coating layer sufficiently thick so that the coating layer is flush with the lip.

15. The method of claim 14 further including:
at least partially filling the cavities with a sacrificial material before the cavities are covered with the cover, the sacrificial material decomposing when exposed to heat; and
curing the cover and the coating.

16. The method of claim 14 wherein the cover is fabricated from a fluoroelastomer.

17. The method of claim 14 wherein the body is manufactured from a material selected from the group consisting of aluminum, an aluminum alloy, titanium, a titanium alloy and combinations thereof.

* * * * *